United States Patent
Hansen

[15] 3,680,669
[45] Aug. 1, 1972

[54] CLUTCH-BRAKE MECHANISM AND CONTROL SYSTEM THEREFOR

[72] Inventor: Quinten A. Hansen, Highway 38, Franksville, Wis. 53126

[22] Filed: Dec. 14, 1970

[21] Appl. No.: 97,678

[52] U.S. Cl............192/18 R, 192/48.91, 192/87.16, 192/93 A
[51] Int. Cl............................................F16d 67/02
[58] Field of Search....192/18 R, 93 A, 87.16, 87.17, 192/48.91

[56] References Cited

UNITED STATES PATENTS

| | | | |
|---|---|---|---|
| 2,014,683 | 9/1935 | Hubert | 192/18 R |
| 2,775,330 | 12/1951 | Schjolin et al. | 192/87.16 |
| 2,852,116 | 9/1958 | Spase | 192/93 A |
| 2,891,642 | 6/1959 | Moore | 192/18 R |
| 2,930,460 | 3/1960 | Isaacson | 192/18 R |
| 3,420,343 | 1/1969 | Stiepel | 192/18 R |

Primary Examiner—Benjamin W. Wyche
Assistant Examiner—Randall Heald
Attorney—James E. Nilles

[57] ABSTRACT

A clutch-brake mechanism in which the brake is disengaged while the clutch is engaged and vice-versa. Parts of the clutch and brake are connected together and are simultaneously actuated by a single actuating member and the arrangement is such that the device is very compact particularly in an axial direction. A power transmission including a pair of such mechanisms and separate steering and brake control systems both of which are connected separately to the mechanisms.

24 Claims, 9 Drawing Figures

INVENTOR:
QUINTEN A. HANSEN
BY:
James E. Nilles
ATTORNEY

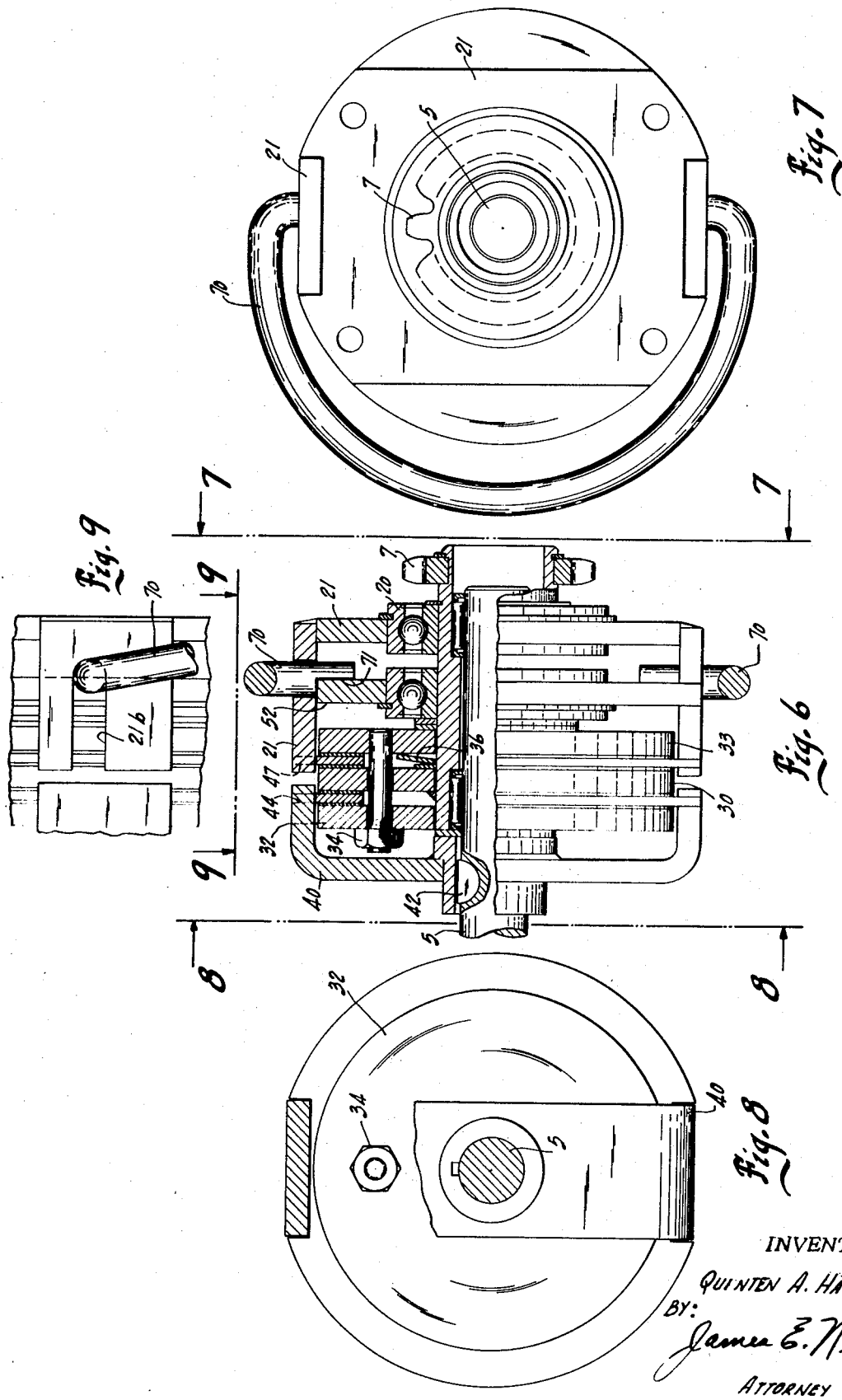

CLUTCH-BRAKE MECHANISM AND CONTROL SYSTEM THEREFOR

BACKGROUND OF THE INVENTION

In power transmissions for all-terrain vehicles for example, steering is effected by momentarily applying the brakes to the driving ground engaging members at one side of the vehicle. To accomplish this, clutch-brake units have been provided wherein the driving clutch to the ground wheel on one side is momentarily disengaged while the brake is applied to that particular wheel. Heretofore, these clutch-brake units have been fabricated from numerous parts and have resulted in rather large and bulky devices. Furthermore, they were difficult to assemble, maintain in proper operating order, and repair.

An example of such a prior art device is shown in my U.S. Pat. No. 3,386,545, which issued June 4, 1968, and is entitled "Alternatively Operable Couplings with Intervening Actuator Encircling Thrust Rod in Spline of Hub." In that device however, many complex and expensive parts were necessary, and the device was comparatively large, particularly in an axial direction, and the instant invention departs from that patented device and provides a distinctly different principle of operation.

SUMMARY OF THE PRESENT INVENTION

The present invention provides a clutch-brake device in which the brake and clutch packs are located axially to one side of the actuating member for both packs. The brake and clutch packs are tied together so that they are selectively and alternately caused to be in engagement, and they are actuated by the actuating mechanism which is located axially to one side thereof. The device is comprised of a minimum number of parts which results in a simple, yet highly efficient mechanism.

Another aspect of the invention relates to a power transmission including control mechanism for a pair of such clutch and brake mechanisms, one of which mechanisms being provided for the ground engaging members at each side of the vehicle. Steering control means are connected to the mechanisms so that the ground engaging members at the sides of the vehicle can be selectively and alternately operated to effect steering. Additionally, an operator brake control is connected to each of the clutch and brake mechanisms so that both can be simultaneously braked when it is desired to slow or stop the vehicle.

These and other objects and advantages of the present invention will appear hereinafter as this disclosure progresses, reference being had to the accompanying drawings.

BRIEF DESCRIPTION OF THE DRAWINGS

FIG. 6 is a view similar to a portion of FIG. 3, but showing modification of the clutch-brake mechanism;

FIG. 7 is an end, elevational, transverse view taken generally along the line 7—7 in FIG. 6;

FIG. 8 is a transverse elevational view taken generally along the line 8—8 of FIG. 6, certain parts shown as broken away or in section for clarity; and FIG. 9 is a fragmentary, plan view of a portion of the device shown in FIG. 6.

DESCRIPTION OF A PREFERRED EMBODIMENT

Figure 1:
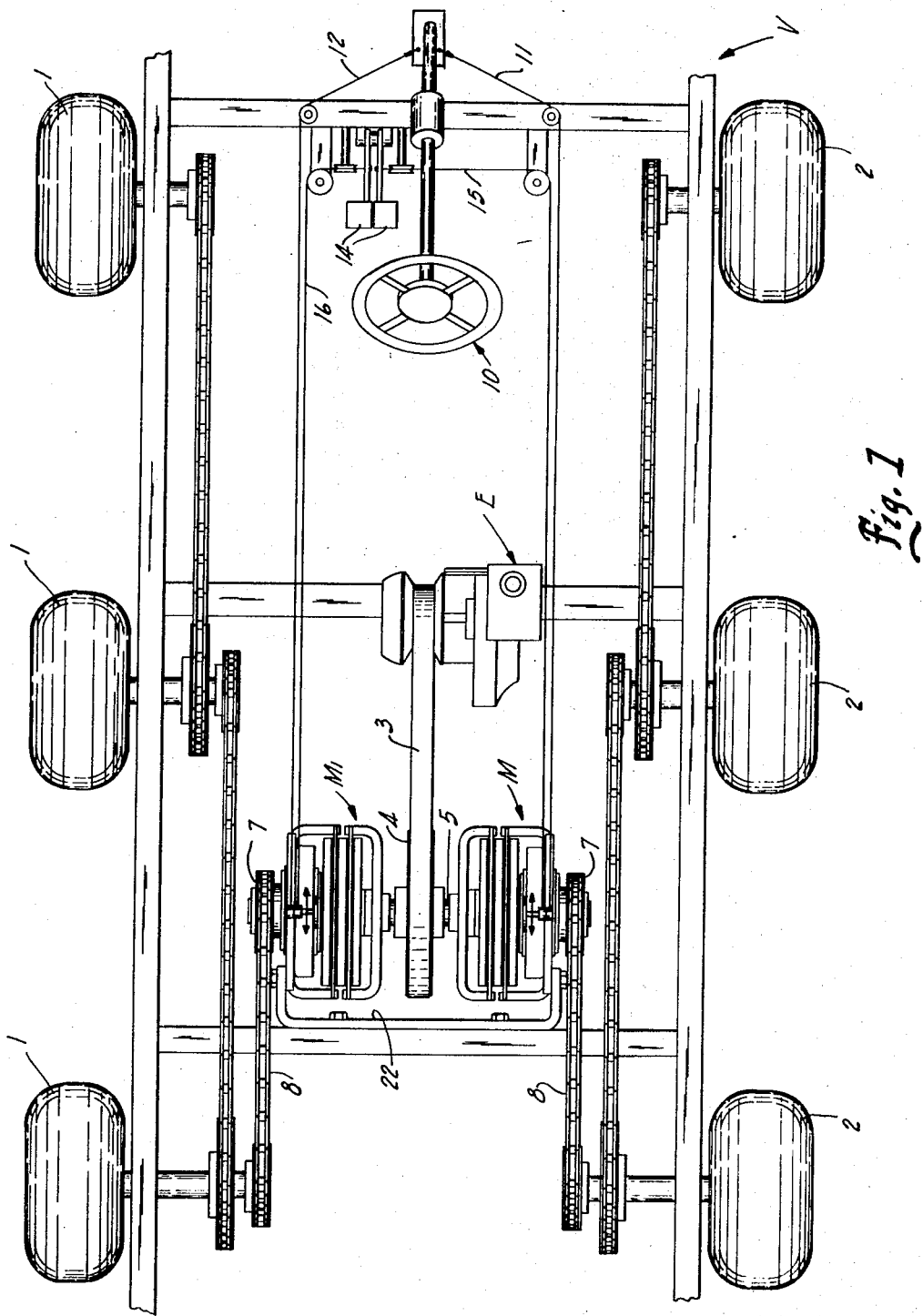
FIG. 1 is a general, more or less schematic diagram showing an all terrain vehicle including the steering and brake control system for a power transmission including a pair of clutch-brake mechanisms.
Figure 2:
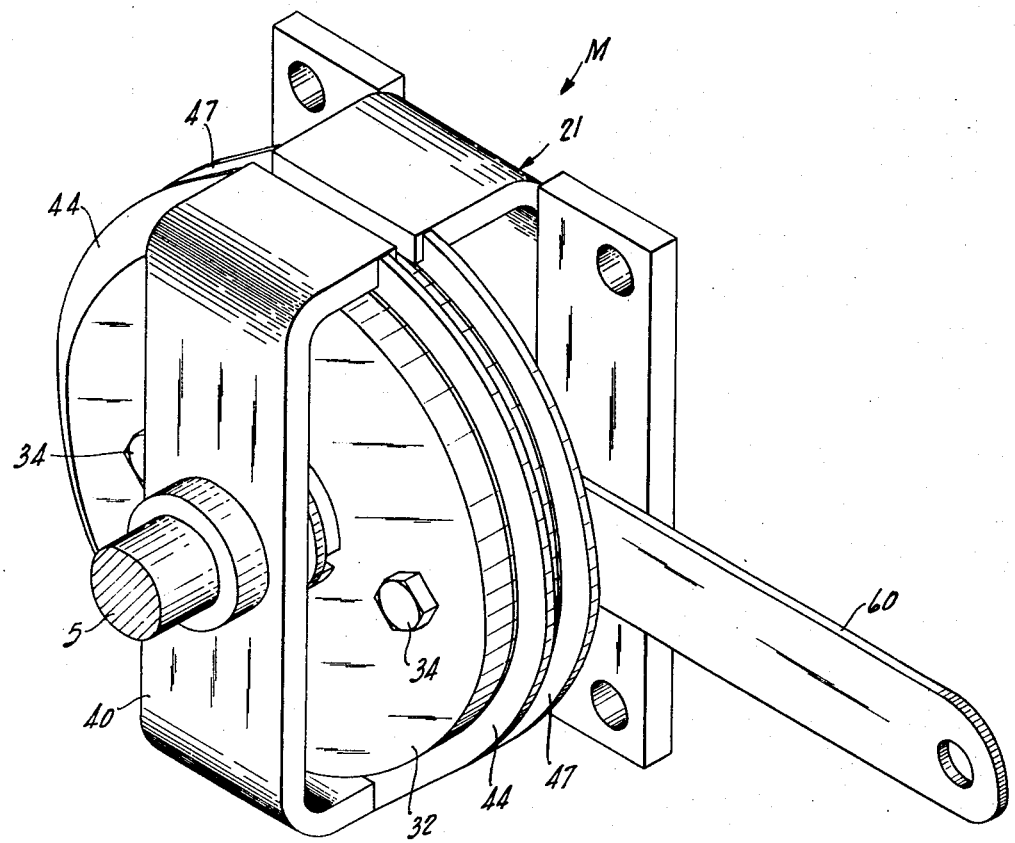
FIG. 2 is a perspective view of one of the clutch-brake mechanisms shown in FIG. 1.

Referring to the general arrangement as shown in FIG. 1, a vehicle V is provided with ground engaging members, such as wheels 1 and 2 located at opposite sides of the vehicle. In all-terrain vehicles of the character with which this invention finds particular utility, steering is effected by momentarily disengaging the clutch and applying the brake to the wheels at one side of the vehicle while the opposite ground engaging wheels continue to be driven. When it is desired to slow or stop the vehicle the mechanisms can be simultaneously shifted to neutral or the brakes of both mechanisms applied simultaneously.

The vehicle includes an internal combustion engine E which provides power via the endless belt 3 to a large sheave 4 that is fixed to the main drive shaft 5. A pair of clutch-brake mechanisms M and M1 are provided, one on each side of the main sheave 4, and these mechanisms can provide driving power from the shaft 5 to their output sprocket 7.

The output sprockets 7 are connected to their respective ground wheels by means of the endless chains 8, or the like. A steering wheel apparatus 10 is provided for the operator and connections in the form of cables 11 and 12 are connected between the steering wheel apparatus and the respective clutch-brake mechanisms M and M1, respectively. When the apparatus 10 is turned in one direction, one of the mechanisms is actuated to cause its normally engaged clutch to be disengaged and its brake to be engaged. The other mechanism is unaffected and its clutch continues to drive its ground wheel.

The operator also has under his control a brake pedal 14 which has connections, such as cables 15 and 16, respectively, with the clutch brake mechanisms M and M1. Depression of the brake pedal 14 causes simultaneous pulling on the cables 15 and 16 and consequently simultaneous actuation of the brakes B of the units M and M1, and disengagement of the clutches thereby causing the ground engaging wheels of the vehicle to stop.

The steering apparatus and the brake control are both connected to the same operating lever of their respective mechanisms thereby operating the same brake of the mechanism to both steer and perform the brake function.

The clutch-brake mechanisms will now be described in detail and it should be understood that these mechanisms are similar and therefore, detailed reference to only one is deemed to be necessary.

Figure 3:
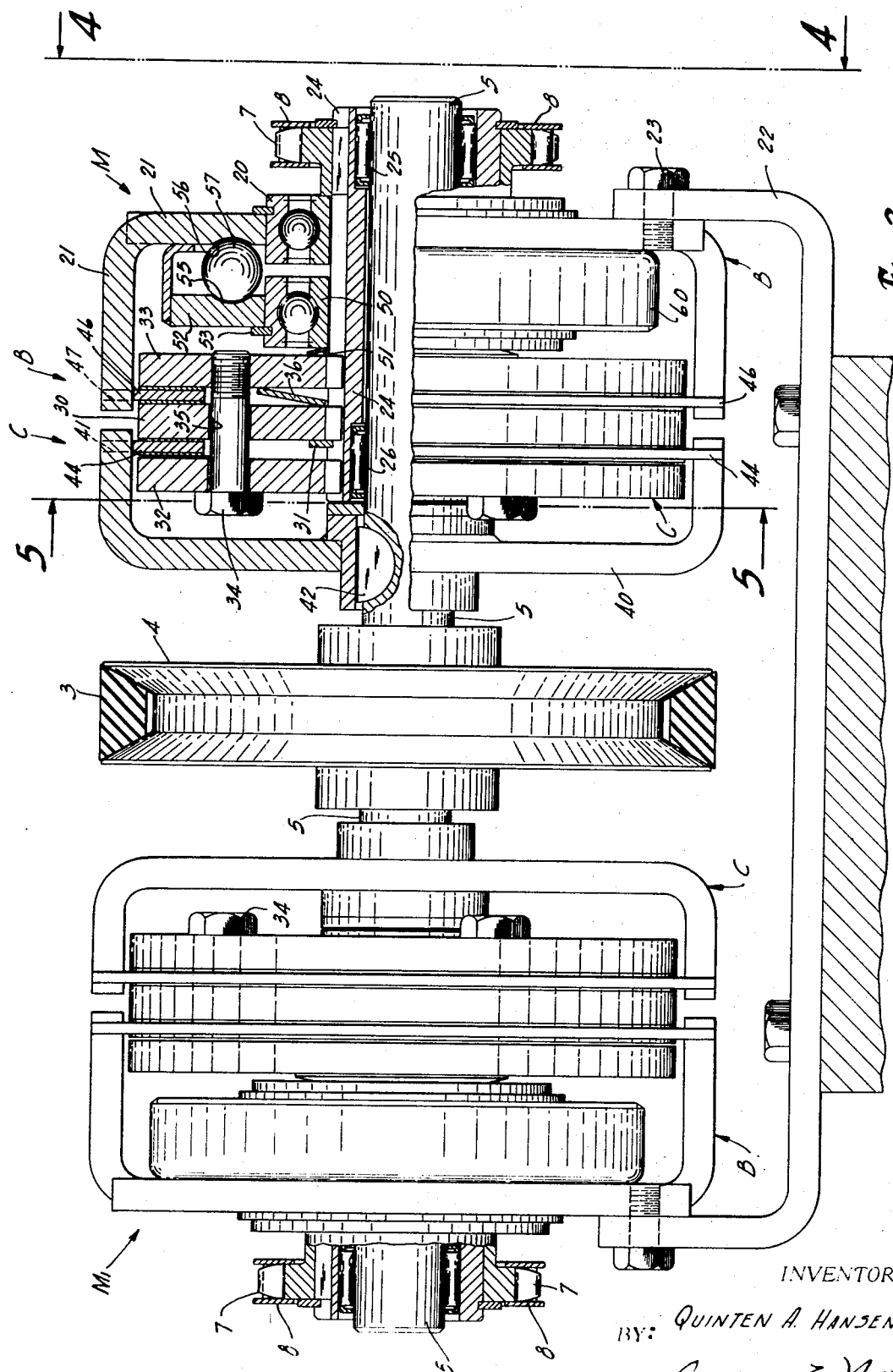
FIG. 3 is a longitudinal, cross sectional view through the transmission including a pair of clutch-brake units.

Referring specifically to FIG. 3, the mechanism M includes a stationary brake member 21 which is rigidly secured to a vehicle frame member 22 by bolt means 23. This stationary brake member 21 performs three functions; namely, it acts as a brake cup for its friction plate, a main mounting means for the mechanisms and the power shaft, and acts as one portion of the actuating means to be described in detail. The member 21 has an anti-friction ball bearing assembly 20 mounted centrally therein, and an elongated and exteriorly splined hub 24 is rotatably mounted within the anti-friction bearing assembly 20. The elongated hub 24 is also journalled for rotation on the needle bearing assemblies 25 and 26 which are mounted on the main power shaft 5. The elongated hub has its output sprocket 7 splined thereto which delivers power via endless chain 8 to its respective ground wheels, as previously mentioned.

A fixed reaction plate 30 is splined to the hub and a stop ring 31 on the hub locates the plate 30 in an axial direction.

Also axially splined to the hub 24 are a pair of clamping plates 32 and 33 which are fixed together as a unit by the circumferentially space bolt means 34 which extend through the clamping plate 32 and are threadably engaged in the plate 33. These bolt means 34 also extend freely through apertures 35 in the reaction plate 30 and consequently, the plates 32 and 33 can be axially shifted on the splined hub in one direction or another as a unit. A Belleville spring 36 between the fixed plate 30 and the clamping plate 33, urges the plates 32 and 33 to the brake disengaged and clutch engaged position, as will appear.

A generally C-shaped, power input clutch member 40 is fixed by a key 42 to the shaft 5. In operation, continuous rotation of the shaft 5 under power from the engine E also causes continuous rotation of the power input clutch member 40.

Friction plate means 44 are connected by their diametrically opposed peripheral recess 41 to the free ends of the C-shaped member 40, and plate means 44 extends inwardly and are located within member 40. The plate means 44 are capable of slight axial movement in respect to member 40. Any number of plates may be used to constitute the plate means 44, and only one plate has been shown.

The clutch plate means 44 connected to the input member 40, the axially shiftable clamping plate 32 splined on the hub, and the reaction plate 30 also splined on the hub, all act as a disengageable clutch C to transmit power from shaft 5 to the hub 24 and its sprocket 7.

A disengageable brake is provided between the hub 24 and the stationary brake member 21 fixed to the vehicle frame, as follows.

Other friction plate means 46 are mounted by their peripheral slots 47 on the axially extending flanges of the stationary C-shaped brake member 21. The clutch plate means 46 are located between the reaction member 30 and the axially shiftable clamping plate 33.

When the end plates 33 and 32 are shifted as a unit to the left as viewed in FIG. 3, that is to the brake engaging position, clamping plate 33 clamps the plate means 46 against the reaction plate 30, thus causing engagement of the brake B which is formed by the clamping plate 33, the fixed reaction plate 30, and the clutch plate means 46. When the brake is so engaged, the clutch C is disengaged.

Conversely, when the clamping plates 32 and 33 are permitted to be shifted as a unit to the right (as viewed in FIG. 3) by the bias of Belleville spring 36, namely to the clutch engaged and brake release position, the clamping plate 32 causes the clutch plate means 44 to be clamped up against the reaction plate 30 thereby engaging the clutch C and disengaging the brake B.

It will be noted that the Belleville spring 36 normally acts to cause the plates 32 and 33 to be shifted to the brake disengaged and clutch engaged position. When in this position, driving power is furnished to the wheels connected with that particular clutch-brake mechanism.

An engager is provided for the clutch-brake mechanism, and one such engager has been shown as an example, as follows. Another anti-friction ball bearing assembly 50 is located on the hub 24 and a light Belleville spring 51 is located between the inner race of the bearing assembly 50 and the clamping plate 33 for a purpose that will presently appear. An actuating plate 52 is mounted on the outer race of the anti-friction ball bearing assembly 50 and a snap ring 53 in the outer race of the bearing assembly abuts against one side of the actuating plate 52.

Figure 4:
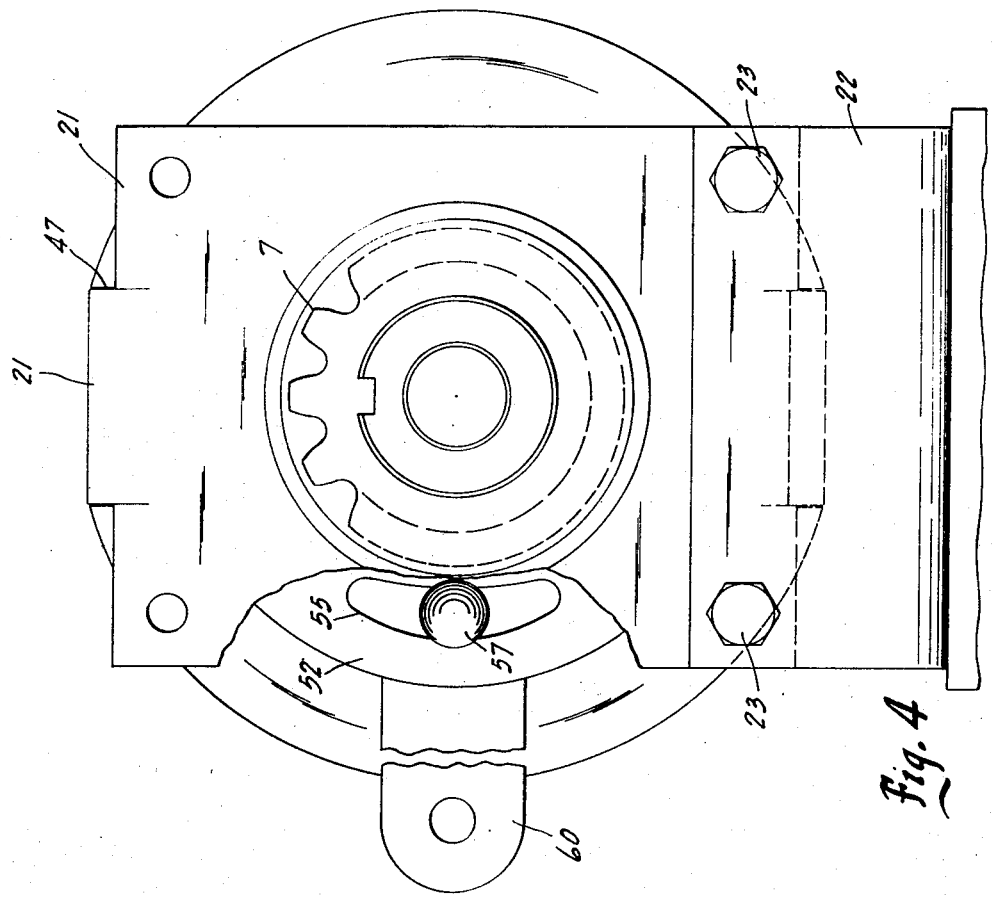
FIG. 4 is a transverse, end elevational view of one of the mechanisms, the view being taken generally along the line 4—4 in FIG. 3 with certain parts being shown as broken away for clarity.
Figure 5:
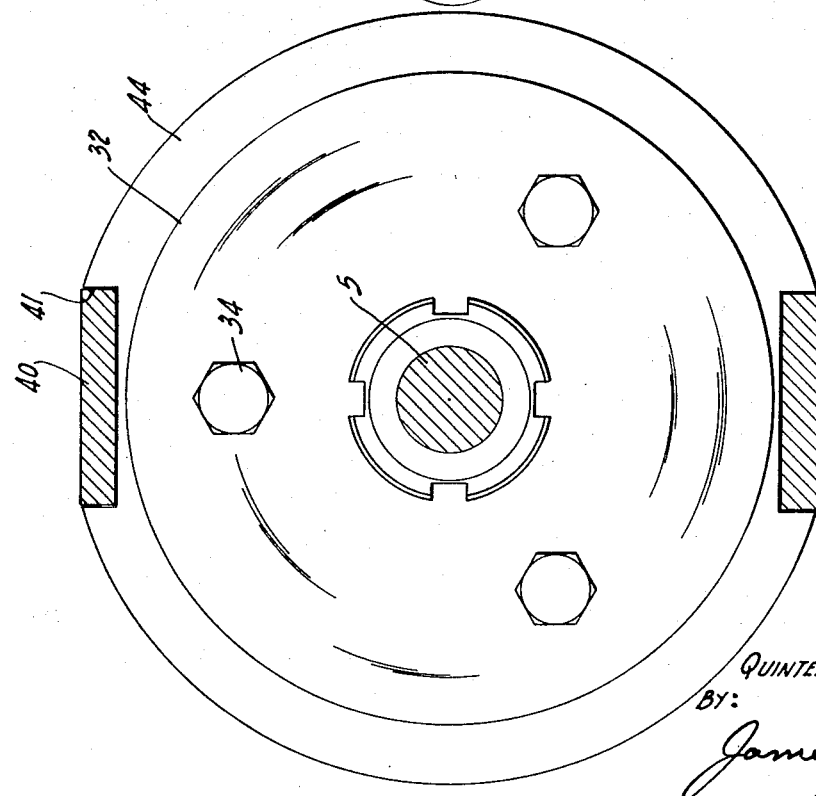
FIG. 5 is a transverse, sectional view taken generally along the line 5—5 in FIG. 3.

A pair of oppositely facing cam grooves 55 and 56 are located, respectively, in the actuating plate 52 and in the stationary brake member 21. The pairs of cam grooves 55 and 56 are generally aligned in an axial direction and a steel ball 57 is located between each pair of grooves for rolling contact therein. As viewed in FIG. 4, it will be noted that the cam grooves are similarly shaped at each of their ends so that the cam can function in either direction. As will appear, this will permit the cable steering mechanism to be symmetrically arranged. The actuating plate 52 has an actuating lever means 60 welded thereto and which extends radially outward of the brake member 21. In this manner, rotational swinging of the lever means 60 in one direction or the other causes the actuating plate 52 to rotationally shift relative to the balls 57 and thereby cause the balls to ride up on the shallow ends of the oppositely facing cam grooves. In other words, swinging of the lever means in one direction or the other causes the actuating plate 52 to axially shift on the hub 24 towards the clutch and brake, carrying with it the anti-friction bearing assembly 50 by transmitting the axial thrust to snap ring 53. This axial shifting of the engager thus formed by the actuating plate and assembly 50, causes the axial shifting of the clamping plates 32 and 33 as a unit and in a clutch disengaging and brake engaging direction, against the bias of the Belleville spring 36.

Referring again to the light spring 51, it functions to urge the anti-friction bearing assembly 50 and its associated actuating plate 52 toward the stationary brake member 21, thereby causing the balls 57 to be retained in their respective cam grooves by keeping the anti-friction bearing assemblies 51 and 50 closely adjacent one another, as permitted by the balls 57.

The FIG. 3 embodiment of the invention thereby provides a rolling ball and cam type actuation for causing actuation of the brake B and simultaneous disengagement of the clutch C. When the lever means 60 is released, the spring 36 returns the plates 32 and 33 to the right, namely to the clutch engaged and brake disengaged position.

The adjustable bolt means 34 is threadably engaged in the plate 33 and extends freely through reaction plate 30. By threadably adjusting the bolt means 34, the desired clearance between plates 32, 33 and plate 30 can be obtained.

A neutral position can be obtained when actuating the mechanism. For example, assuming a clearance of 20,000ths of an inch in the brake plates, then when the brake is being applied, upon movement of approximately 10,000ths a neutral position is reached. Continued movement of the brake toward the engaging position then acts to fully engage the brake and fully release the clutch.

MODIFICATION

Referring now to the device shown in FIG. 6, the arrangement of the clutch and brake is generally the same as described in connection with the device of FIG. 3, and similar parts have been similarly referenced.

The actuating mechanism of the device as shown in FIG. 6 is somewhat different than that shown in FIG. 3 and will now be described. However, certain parts of the actuating means are similar, such as the anti-friction ball bearing assemblies and these have also been similarly referenced.

The actuating mechanism of the FIG. 6 device also includes lever means in the form of an actuating yoke 70 which at its inner end has a flattened surface 71 that bears against the side of the actuating plate 52. The yoke 70 extends through the open ended slots 21b in the flanges of member 21 and thereby bears against the flanges so as to pivot thereabout. Thus, as the yoke is swung in a generally axial direction, the inner end of the yoke urges the plate 52, against the bias of the spring 36, to the brake engaged and clutch released position. The spring 36 acts to return the clamping plates 32 and 33 to the normal, clutch engaged and brake released position.

OPERATION

The general operation of the power transmission provided by the present invention is as follows. When the operator of the vehicle desires to turn in one direction or another, he simply turns the steering wheel 10 in the appropriate direction. This turning movement causes one of the cables to be pulled tightly thereby engaging the brake and disengaging the clutch of that particular mechanism. The other cable is simply permitted to be slack thereby not effecting the other clutch-brake mechanism. Thus, turning movement of the vehicle is accomplished by actuating the brake and releasing the clutch on one side of the vehicle or the other.

In order to stop the unit, the brakes B of both of the mechanisms must be simultaneously applied and their clutches simultaneously released. To accomplish this, the brake pedal 14 is depressed which causes both of the cables 15 and 16 to be pulled tightly. The cables 15 and 16 are also connected to the operating lever 60 of their respective clutch brake mechanisms, thereby causing engagement of both of the brakes and release of both of the clutches. In this manner, the brakes of the mechanisms are used both for the steering function and for the braking function.

I claim:

1. A clutch-brake mechanism comprising an engageable brake including a stationary brake member and an axially shiftable clamping plate, an input power shaft, an elongated hub rotatably mounted on said power shaft and also journalled for rotation in and supported by said stationary brake member, a disengageable clutch including an input clutch member fixed to said shaft for rotation therewith and also including an axially shiftable clutch plate, connecting means mechanically connecting said clutch plate and brake clamping plate together to cause simultaneous axial movement thereof, axially shiftable actuating means located axially to one side of said brake remote from said clutch, said actuating means also mounted on said hub for engagement with said brake clamping plate to cause engagement of said brake and simultaneous disengagement of said clutch, and lever means for operating said actuating means.

2. A clutch-brake mechanism comprising a stationary brake member, an input power shaft, an elongated hub rotatably mounted on said power shaft and also journalled for rotation in said stationary brake member, an input clutch member fixed to said shaft for rotation therewith, a reaction plate fixed to said hub for rotation therewith, a pair of axially spaced apart clamping plates splined to said hub for axial shifting thereon as a unit, means connecting said clamping plates together and connected to said reaction plate for rotation with said reaction plate and said elongated hub, friction plate means connected to said clutch member and located between one of said clamping plates and said reaction plate so as to form a disengagable clutch therewith, second friction plate means connected to said brake member and located between said reaction plate and the other of said clamping plates so as to form an engagable brake therewith, actuating means mounted on said hub and including an axially shiftable engager for engagement with one of said clamping plates to thereby cause axial shifting thereof and consequent engagement of said brake and simultaneous disengagement of said clutch, and means for operating said actuating means.

3. The mechanism set forth in claim 2 further characterized in that said axially shiftable engager comprises an anti-friction ball bearing assembly axially slideable on said hub and a plate mounted on said bearing assembly for sliding therewith.

4. The mechanism set forth in claim 2 further characterized in that said pair of axially spaced apart clamping plates are connected together by bolt means which also extend through said reaction plate, said reaction plate being located axially between said clamping plates.

5. The mechanism set forth in claim 4 further characterized in that said bolt means is threadably engaged in one of said clamping plates and is adjustable to vary the clearance between said reaction plate and said clamping plates.

6. The mechanism set forth in claim 2 further characterized in that said stationary brake member has an axially fixed anti-friction ball bearing assembly mounted centrally therein and said elongated hub is journalled in said axially fixed anti-friction ball bearing assembly.

7. The mechanism set forth in claim 3 further characterized in that said stationary brake member has an axially fixed anti-friction ball bearing assembly mounted centrally therein and said elongated hub is journalled in said axially fixed anti-friction ball bearing assembly.

8. The mechanism set forth in claim 2, wherein said operating means includes lever means extending radially outward from said stationary brake means for swinging movement in respect thereto.

9. The mechanism set forth in claim 2 further characterized in that said actuating means includes an axially shiftable engager on said hub, said engager and said stationary brake member having opposed cam grooves therein, and ball means in said opposed cam grooves; and said means for actuating said actuating means includes lever means connected to said engager for rotating the engager and thereby causing said balls to ride up on said opposed cam grooves and axially displace said engager and consequently also displace said clamping plates.

10. The mechanism set forth in claim 9 further characterized in that said axially shiftable engager comprises an anti-friction ball bearing assembly axially slideable on said hub and a plate mounted on said bearing assembly for sliding therewith.

11. The mechanism set forth in claim 9 further characterized in that said pair of axially spaced apart clamping plates are connected together by bolt means which also extend through said reaction plate, said reaction plate being located axially between said clamping plates.

12. The mechanism set forth in claim 11 further characterized in that said bolt means is threadably engaged in one of said clamping plates and is adjustable to vary the clearance between said reaction plate and said clamping plates.

13. The mechanism set forth in claim 9 further characterized in that said stationary brake member has an axially fixed anti-friction ball bearing assembly mounted centrally therein and said elongated hub is journalled in said axially fixed anti-friction ball bearing assembly.

14. The mechanism set forth in claim 10 further characterized in that said stationary brake member has an axially fixed anti-friction ball bearing assembly mounted centrally therein and said elongated hub is journalled in said axially fixed anti-friction ball bearing assembly.

15. The mechanism set forth in claim 9 wherein said operating means includes lever means extending radially outward from said stationary brake means for swinging movement in respect thereto.

16. The mechanism set forth in claim 2 further characterized in that said actuating means includes an axially shiftable engager on said hub, and lever means extending radially outwardly of said stationary brake member and bearing thereagainst to form a pivot connection therewith, said lever means at its radially inner end bearing against said engager whereby when the outer end of said lever means is shifted in an axial direction, it also axially shifts said engager.

17. The mechanism set forth in claim 16 further characterized in that said axially shiftable engager comprises an anti-friction ball bearing assembly axially slideable on said hub and a plate mounted on said bearing assembly for sliding therewith.

18. The mechanism set forth in claim 16 further characterized in that said pair of axially spaced apart clamping plates are connected together by bolt means which also extend through said reaction plate, said reaction plate being located axially between said clamping plates.

19. The mechanism set forth in claim 18 further characterized in that said bolt means is threadably engaged in one of said clamping plates and is adjustable to vary the clearance between said reaction plate and said clamping plates.

20. The mechanism set forth in claim 16 further characterized in that said stationary brake member has an axially fixed anti-friction ball bearing assembly mounted centrally therein and said elongated hub is journalled in said axially fixed anti-friction ball bearing assembly.

21. The mechanism set forth in claim 17 further characterized in that said stationary brake member has an axially fixed anti-friction ball bearing assembly mounted centrally therein and said elongated hub is journalled in said axially fixed anti-friction ball bearing assembly.

22. The mechanism set forth in claim 16 wherein said operating means includes lever means extending radially outward from said stationary brake means for swinging movement in respect thereto.

23. A clutch-brake mechanism comprising a stationary brake member, an anti-friction bearing assembly mounted centrally in said brake member, an input power shaft, an elongated hub rotatably mounted on said power shaft and also journalled for rotation in said bearing assembly in said stationary brake member, an input clutch member fixed to said shaft for rotation therewith, a reaction plate fixed to said hub for rotation therewith, a pair of axially spaced apart clamping plates splined to said hub for axial shifting thereon as a unit, bolt means connecting said clamping plates together and extending through said reaction plate, said reaction plate being located axially between said clamping plates, friction plate means connected to said clutch member and located between one of said clamping plates and said reaction plate so as to form a disengagable clutch therewith, second friction plate means connected to said brake member and located between said reaction plate and the other of said clamping plates so as to form an engageable brake therewith, actuating means mounted on said hub and including an anti-friction bearing assembly axially slideable on said hub and a plate mounted on said assembly for engagement with one of said clamping plates to thereby cause axial shifting thereof and consequent engagement of said brake and simultaneous disengagement of said clutch, and lever means extending radially outwardly from said stationary brake means for operating said actuating means.

24. The mechanism set forth in claim 23 further characterized in that said bolt means is threadably engaged in one of said clamping plates and is adjustable to vary the clearance between said reaction plate and said clamping plates.

* * * * *